US008289392B2

(12) United States Patent
Senior et al.

(10) Patent No.: US 8,289,392 B2
(45) Date of Patent: *Oct. 16, 2012

(54) AUTOMATIC MULTISCALE IMAGE ACQUISITION FROM A STEERABLE CAMERA

(75) Inventors: Andrew William Senior, New York, NY (US); Sharathchandra Pankanti, Rego Park, NY (US); Arun Hampapur, Norwalk, CT (US); Lisa Marie Brown, Pleasantville, NY (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/166,732

(22) Filed: Jul. 2, 2008

(65) Prior Publication Data
US 2008/0259179 A1    Oct. 23, 2008

Related U.S. Application Data

(63) Continuation of application No. 11/074,383, filed on Mar. 7, 2005, now Pat. No. 7,796,154.

(51) Int. Cl.
*H04N 7/18* (2006.01)

(52) U.S. Cl. ...................................... 348/154; 348/143

(58) Field of Classification Search .................. 348/143, 348/154
See application file for complete search history.

(56) References Cited

U.S. PATENT DOCUMENTS

| 6,907,570 B2 * | 6/2005 | Amir et al. .................... 715/720 |
| 2005/0134685 A1 * | 6/2005 | Egnal et al. .................... 348/157 |
| 2006/0061653 A1 | 3/2006 | Hampapur et al. |

OTHER PUBLICATIONS

Bob Fisher; The RANSAC (Random Sample Consensus) Algorithm; May 6, 2002; available at http://homepages.inf.ed.ac.uk/rbf/CVonline/LOCAL_COPIES/FISHER/RANSAC/.*
A.Hampapur,L.Brown,J.Connell,S.Pankanti,A.W.Senior,Y.L.Tian Smart Surveillance:Aplpications, Technolgies &Implications, IEEE Pacific Rim Cont. on Multimedia,Singapore,Dec. 2003.
Xuhui Zhou,et al."A Master-Slave System to Acquire Biometric Imagery of Humans at a Distance",First ACM SIGMM International Workshop on Video Surveillance(2003).
C.J. Costello,C.P. Diehl,A.Banerjee,H.Fisher Scheduling an Active Camera to Observe People,in Visual Surveillance and Sensor Networks,p. 46,ACM,Oct. 2004.
Chris Stauffer,Kinh Tieu, Automated MUlti-Camera Planar Tracking Correspondence Modeling,Proceedings of Computer Vision and Pattern Recognition,vol. 1,pp. 259-266,Jul. 2003.
Jean-Yves Bouguet,"Pyramidal Implementation of the Lucas Kanade Feature Tracker" Intel OpenCV Documentation (1999).

* cited by examiner

*Primary Examiner* — Mehrdad Dastouri
*Assistant Examiner* — Jeremaiah Hallenbeck-Huber
(74) *Attorney, Agent, or Firm* — August Law, LLC; George Willinghan

(57) ABSTRACT

A system for automatically acquiring high-resolution images by steering a pan-tilt-zoom camera at targets detected in a fixed camera view is provided. The system uses automatic or manual calibration between multiple cameras. Using automatic calibration, the homography between the cameras in a home position is estimated together with the effects of pan and tilt controls and the expected height of a person in the image. These calibrations are chained together to steer a slave camera. The manual calibration scheme steers a camera to the desired region of interest and calculates the pan, tile and zoom parameters accordingly.

17 Claims, 8 Drawing Sheets

AUTOMATIC MULTISCALE IMAGE ACQUISITION FROM A STEERABLE CAMERA

CROSS-REFERENCE TO RELATED APPLICATIONS

The present application is a continuation of co-pending U.S. application Ser. No. 11/074,383, filed Mar. 7, 2005. The entire disclosure of that application is incorporated herein by reference.

FIELD OF THE INVENTION

The present invention, relates to the field of video camera systems. More particularly, the present invention relates to the field of video surveillance through automatic control of steerable cameras to acquire close-up views of areas of interest.

BACKGROUND OF THE INVENTION

Video cameras are widely used for surveillance. Video surveillance involves the acquisition of visual information from one or more video cameras and the identification or detection in the acquired visual information of events of interest, e.g. shoplifting or unauthorized entry. Detection of the events of interest can be accomplished either concurrent with video acquisition or later following a period of storage.

A common shortcoming with current video surveillance systems is the poor quality of the surveillance video. In addition, the degree of coverage provided to a given area through video surveillance is often limited due to the expense associated with providing a high degree of coverage, since a high degree of coverage requires more cameras, wiring, storage and monitoring facilities. However, a lower degree of coverage increases the opportunity for events of interest to occur outside of the field of view of the deployed cameras. For example, when the acquired video is needed to investigate a bank robbery, the events of interest may have taken place out of the field of view of the deployed cameras, either by coincidence or design. Even for events of interest that occur within the field of view of the deployed cameras, objects, for example faces of the perpetrators or car license plate numbers, can be too small or indistinct in the video to be readily identified because of the limited visual acuity of the deployed cameras.

In general in a video surveillance application, there is a minimum desired camera resolution that is practical or effective. In face recognition, surveillance and audio-visual speech recognition, for example, sufficiently high resolution images of the face are necessary for recognition to be practical. The area of coverage of such systems is usually limited by the need for resolution, since visual acuity is balanced against coverage area by varying the focal length of the video camera lenses. Therefore, a higher degree of visual acuity, i.e. a sharper image, results in a smaller coverage area and vice versa. Additional coverage can be achieved by adding cameras at additional expense and increased architectural complexity for the system. Ultrahigh resolution cameras with wide angle lenses have been proposed to alleviate the problem of decreased field of view with increased resolution; however, ultrahigh resolution cameras are expensive. In addition, the use of ultrahigh resolution cameras requires the replacement of existing cameras and even some of the ancillary monitoring equipment. The cost associated with installing these nonstandard ultrahigh resolution cameras inhibits their adaptation and installation.

Regardless of whether standard or ultrahigh resolution cameras are used, these cameras are typically fixed in place and provide a single fixed focal length. In many applications, however, the range of scales to be observed are practically unlimited, and a fixed location for events of interest is difficult to predict. Therefore, fixed non-zoom cameras can not provide the same level of functionality as moveable zoom cameras, which can also be high-resolution, for delivering detailed images of events of interest.

One proposed approach to using moveable zoom cameras deploys steerable, i.e. Pan-Tilt, cameras having a variable focal length, i.e. zoom. These types of cameras are known as pan-tilt-zoom (PTZ) cameras and can be moved to point at an area of interest and zoomed or focused to obtain a high-resolution image of an object within that area. This approach, however, is not without limitations. First, in order to aim and focus a camera on an object of interest within an area of interest, the object of interest needs to be identified. In addition, even if the object is identified, that object needs to be located in order to determine where to aim and focus the camera in order to obtain a high-resolution image of the object.

In most applications, the task of identifying objects of interest and the location of these objects is delegated to a human operator, for example a security guard situated in front of a panel of monitors. The security guard selects areas of interest, manually steers a camera to point at those areas, and manually focuses or zooms the camera on one or more objects within those areas. Successful application of this system requires a sufficient number of cameras and monitors to provide coverage of the larger areas of potential interest. If the operator is not available or is not looking at a potential area of interest, then events of interest can be missed. Therefore, attempts have been made to mitigate the limitations association with the use of human camera operators.

Methods have been devised that connect a camera controller to a door switch. When the door is opened, the switch is activated. Activation of the switch makes the camera automatically steer in the direction of the door and focus on the area of the door opening to get a close-up of the any persons passing through the door opening.

In U.S. patent application Ser. No. 10/933,660, filed Sep. 3, 2004, Hampapur et al., describe a video surveillance system that uses sophisticated six-degree-of-freedom calibration of two or more cameras to triangulate the location of objects such as people's heads. The triangulation information is used to direct additional steerable cameras to point at the heads.

SUMMARY OF THE INVENTION

The present invention is directed to methods and systems for steering a moveable and controllable camera to a region of interest as determined from the view of another "master" camera, eliminating the need for complicated calibrations and for the use of two fixed cameras. The master camera can be a fixed camera or a steerable camera. Camera control policies are used to create an automatic camera control system. The camera control policies work in conjunction with a manual registration stage or with a system for automatically learning the homography between the fixed and moveable cameras in some home position and the effect of pan, tilt and zoom on the steerable camera.

Exemplary systems in accordance with the present invention achieve automatic multi-resolution surveillance data. From a wide-angle, fixed camera view, information about the location and general behavior of objects is acquired. From the automatically steered zoom camera, higher resolution details of objects of interest or events of interest are obtained.

Systems in accordance with exemplary embodiments of the present invention use an automated method to direct steerable cameras without using formal spatial calibration information. Events of interest are detected or identified by applying image processing algorithms, e.g. motion detection and tracking, to video images acquired from one or more fixed cameras. Attributes such as the presence of motion, the direction or speed of motion, the presence of an object belonging to a particular class, for example a face, the type of an object or other attributes such as shape, color, behavior, motion and orientation are used to identify the location of the events of interest. The identified locations of these events determine the direction in which one or more steerable cameras are directed, with the direction chosen such that each steerable camera is directed at the location where one of the events occurred. In one embodiment, regions or points in the input image are associated with parameters of one or more steerable cameras. These associations can be made automatically if some calibration information is available or if it is learned, or can be manually assigned by an operator.

Camera control policies are developed to control the steerable cameras based upon the detected events, the location and availability of system resources, the surveillance application and the type of event identified. Each camera control policy developed attempts to optimize different objective functions of each camera's utility. These objective functions include, but are not limited to, trying to observe all events at least once, e.g. capturing the faces of all passers-by, ensuring that a given event is observed throughout its duration, e.g. tracking a shoplifter continuously from the time of the suspicious act to the time the shoplifter leaves the store, optimizing the views of the cameras, e.g. choosing a camera that will get a frontal face shot instead of one that will point at the back of the head or choosing one that is closest to the object or has the most overhead view, and trying to have multiple views of each object, e.g. seeing both front and back license plates of a vehicle. Other objective functions include the imaged size of an object, the orientation of an object, the location of an object, the length of time an object is viewed, the number of times an object is viewed, the chance of viewing an object before that object is no longer visible, the speed of the object, the type of the object or any other measured parameter of the object, the time taken to steer an available camera to view the object and combinations thereof. Since the number of simultaneous events detected can exceed the number of cameras available to observe these events, suitable policies direct each camera at each time instant in a manner that makes optimal use of the limited camera resources in accordance with the surveillance priorities of the system.

Systems in accordance with the present invention also utilize input data in the camera control policies from sensors other than video cameras to control one or more of the steerable cameras. These sensors include, but are not limited to, directional sensors, such as visible spectrum cameras, non-visible spectrum cameras, radar and audio beam-forming microphones, and non-directional sensors, such as door switches, pressure pads, pattern information retrieval (PIR) detectors, fire alarms and smoke detectors. These additional sensors can be fixed or stationary devices or can be steered in accordance with the camera control polices. Additional system control is provided by controlling actuators, for example, light sources, in accordance with the camera control policies.

DETAILED DESCRIPTION

Figure 1:
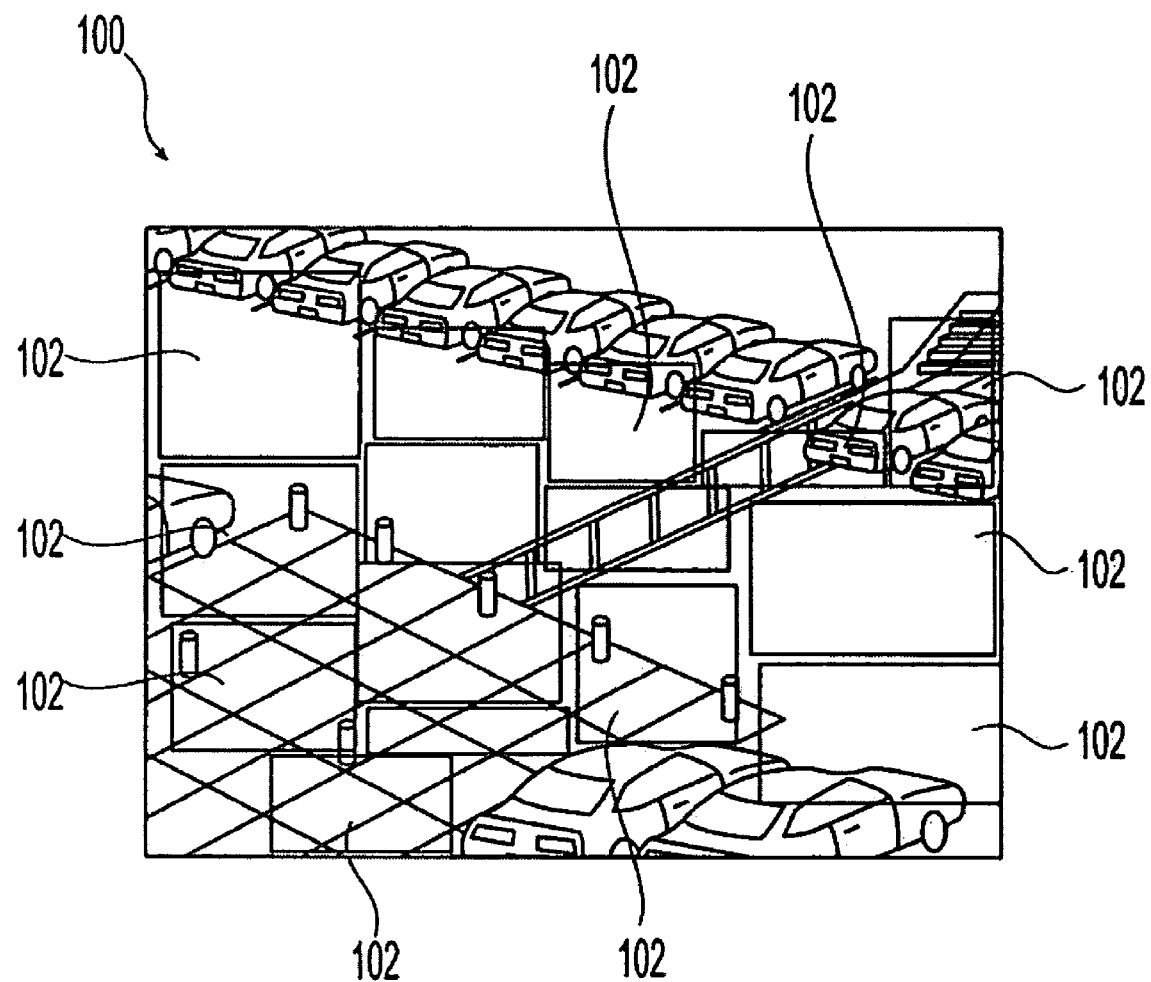
FIG. 1 is an illustration of a field of view of a master camera showing multiple regions of interest in accordance with the present invention.

Image acquisition systems in accordance with exemplary embodiments of the present invention include at least a plurality of video cameras in communication with a control mechanism. Suitable control mechanisms are capable of controlling the operation of each video camera and of retrieving and analyzing video information captured by these video cameras. In one embodiment, the control mechanism includes a logic control device such as a computer, including dedicated computers and general purpose computers. At least one parameter of one of the cameras is controllable by the control mechanism. Controllable parameters include, but they are not limited to, pan, tilt, zoom, focus, speed, aperture and combinations thereof.

The image acquisition system monitors one or more areas for detection of events of interest. These events of interest include, but are not limited to, the commission of a criminal offense, the occurrence of traffic accidents, the entry of persons into restricted areas, suspicious activity among passengers, disruptive behavior in schools, fire, tactical movements, detection of movement, detection of an object, the speed of movement of an object, the movement pattern of an object, appearance of an object, behavior of an object, type of object and combinations thereof.

In order to facilitate the monitoring of relevant events of interest, the image acquisition system also includes at least one database containing a table or list of a plurality of pre-defined events of interest. In one embodiment, the database is in communication with the control mechanism. In another embodiment, the database is disposed within the control mechanism, for example on a hard drive in a computer. Each event in the list of pre-defined events includes recognition data to be used by the control mechanism to identify the occurrence of that event using input from the video cameras. Each event also includes control data that provides methods for calculating camera parameters to be used by the control mechanism to control one or more of the steerable cameras. The list of pre-defined events and the methods for calculating camera parameters included therein are arranged to direct the steerable cameras towards the location of the detected events. Therefore, the table of events is indexed to facilitate the steering of cameras toward an identified event. In one embodiment, the table of events is indexed according to the position in the processed video stream of the object that triggered the event. Alternatively, the table of events is indexed according to the time the event occurred.

In use, the control mechanism receives video information from at least one master camera, preferably a fixed camera, and uses recognition data from the pre-defined events list in video and image processing algorithms to determine whether one of the events from the list of pre-defined events has occurred or is in the process of occurring. If the control mechanism determines that an event has occurred, the appropriate cameras are controlled or steered in accordance with the methods for calculating camera parameters contained in the control data associated with that event.

In general, a variety of methods for calculating the desired camera parameters can be used. In one embodiment, the method for calculating the camera parameters includes using fixed values for one or more of the camera's operational parameters, i.e. focal length and direction in which the camera is pointed. In another embodiment, the method for calculating the camera parameters includes interpolating between a pair of fixed camera parameter values based upon the value of another system parameter, for example, the location of the event.

Once the appropriate cameras for monitoring the event have been identified and controlled or steered in accordance with the associated methods for calculating the camera's parameters, the computer identifies the information or data for the cameras to obtain. This information includes, but is not limited to, the duration of video recording, the size of any still frame to capture, the timing of any still frame capture and combinations thereof.

Since exemplary surveillance systems for use in accordance with the present invention include a plurality of cameras and more than one event of interest can occur simultaneously, the present invention includes camera policies to determine which cameras are used to monitor which events. For example, the camera policies determine which steerable camera, when there is more than one steerable camera, is directed to which event, when there is more than one event. In one embodiment, the camera control policy jointly or separately optimizes the views of the steerable cameras. In optimizing the views, the angle at which a steerable camera would view a given event of interest and the visibility of that event from a given camera position are analyzed. Preferably, the camera policies optimize the use of the steerable cameras including jointly or separately optimizing the length of time each camera is directed to a given event and optimizing the number of events to which the cameras are steered. In one embodiment, the camera policy considers any recent controls applied to each one of the steerable cameras. Therefore, cameras that are already viewing a given event of interest are maintained in their existing positions.

An event of interest includes one or more objects or actors that constitute the event, e.g. a person, animal or automobile. These objects of interest within a given event of interest are not generally stationary for extended periods of time. The motion of these objects of interest can be contained within the viewing area of one camera or can carry the objects outside of a given viewing area. Therefore, the camera policies account for the motion of the objects and in particular for the motions that carry the objects outside of the field of view of a given camera. Since the object may be lost or at least no video information is obtained about a given object when that object moves outside of the field of view, the camera control policies attempt to eliminate or to minimize any periods of time during which a given object of interest is outside the field of view of the camera. Preferably, the camera control policies steer a given camera in the direction of a predicted future object location rather than the current object location, to account for lag in the steering process.

In one embodiment, a plurality of additional controllable devices is provided in communication with the computer. These additional devices may be provided in addition to the steerable cameras or may be used to replace one or more of the steerable cameras. Suitable devices include, but are not limited to, sensors and actuators including microphones, parabolic microphones, microphone arrays, radar detectors and emitters, non-visible light spectrum cameras such as infrared cameras, photo diodes, light sources including lasers, and combinations thereof.

Systems for associating steerable camera parameters with each event in a set of events in accordance with exemplary embodiments of the present invention include methods for selecting one or more steerable cameras from a plurality of steerable cameras, methods for identifying or selecting the operational parameters for the selected steerable cameras and methods for identifying or selecting at least one event to be monitored by the selected steerable cameras. In one embodiment, the event is selected by specifying a spatial location or spatial extent for the event. Preferably, the spatial location or spatial extent is selected by choosing a point or by highlighting or indicating a region in a Graphical User Interface (GUI). In one embodiment, the event is selected by choosing an event type. Suitable event types include, but are not limited to, motion presence, object detection or recognition, motion, speed and combinations thereof. Alternatively, the event is selected by choosing a value or quality for one or more parameters including object type and object behavior. In one embodiment, the steerable camera parameters are selected interactively in a graphical display environment by showing video from the selected camera at the current set of parameter values.

In one embodiment, the desired link between various locations or positions within the field of view of a master camera and the steering parameters to be applied to a second, steerable camera is provided by a look-up table. Obtaining the desired parameters from the look-up table is accomplished either manually or automatically. In one exemplary embodiment, the system contains a plurality of video cameras, which may be fixed or steerable. The fixed cameras are the master cameras. Standard tracking algorithms that utilize background subtraction to detect moving objects are used in conjunction with each master camera. Objects of interest are tracked through occlusions to maintain object tracks. Tracking data and data indicating the appearances of a given object are communicated to the control mechanism and stored in the database for further reference, search and play-back. An example of this type of surveillance system is known as the "Smart Surveillance System" and is described in A. Hampapur, L. Brown, J. Connell, S. Pankanti, A. W. Senior, and Y.-L. Tian, *Smart Surveillance: Applications, Technologies and Implications*, IEEE Pacific-Rim Conference on Multimedia, Singapore, December 2003, which is incorporated herein by reference in its entirety.

In one embodiment, the associations between each steerable camera and one or more regions within the field of view of a given master camera is provided through either a manual or automated calibration process utilizing the field of view of the master camera. These regions of interest correspond to target areas such as building entrances, high traffic areas, parking lots and intersections. Referring to FIG. 1, the field of view 100 of a master video camera is illustrated. The field of view has been tiled or subdivided into a plurality of regions of interest 102. In one embodiment, an operator draws each region of interest 102 in the field of view using a graphical user interface (GUI). The regions of interest vary in location, size and shape and can be completely independent of each other or can overlap.

Each region of interest is associated with at least one steerable camera. In one embodiment, at least one steerable camera is manually steered and focused to a selected region of interest, establishing the correspondence between that steerable camera and the selected region of interest. Following this manual association, operational parameters are defined for the steerable camera and communicated to the control mechanism so that the control mechanism can point the steerable camera in the direction of the region of interest and adjust the field of view of the steerable camera to substantially equal the size of the region of interest. Alternatively, the camera parameters of pan, tilt and zoom (p, t, z) that are associated with a given region of interest are programmed, either directly into one or more of the steerable cameras or into the control mechanism, to establish the desired correspondence. These camera parameters are referred to as the 'bead' positions (p, t, z) for the region of interest. In addition to associating a single steerable camera with each region of interest, a plurality of steerable cameras can be pointed to a region of interest and the combined field of view of the plurality of steerable cameras at least substantially equals the region of interest 102. In one embodiment, the surveillance system contains a plurality of master cameras, and each steerable camera is associated with at least one region of interest 102 within the field of view 100 of each master camera.

In operation, the control mechanism tracks objects of interest within the field of view of each master camera. The future location of each object of interest is predicted using, for example, a first order model. These predicted locations are then referenced against the set of regions of interest for a given field of view. Regions of interest that overlap the predicted locations are identified, and the steerable cameras that were associated with the identified regions of interest during calibration are steered to the associated bead position to monitor the future movement of the object of interest.

In one embodiment, continuous tracking of an object of interest across a region of interest is provided. In accordance with this embodiment, a plurality of individual points along the predicted path of the object of interest through a given region of interest are identified and marked. Suitable methods for marking the individual points along the path are described in Xuhui Zhou, Robert T. Collins, Takeo Kanade, and Peter Metes, *A Master-Slave System to Acquire Biometric Imagery of Humans at Distance*, First ACM SIGMM International Workshop on Video Surveillance (2003), which is incorporated herein by reference in its entirety. Having identified the plurality of points along a predicted path of the object of interest, the operational parameters, i.e. the pan, tilt and zoom parameters, for each steerable camera associated with the region of interest are interpolated based upon the predicted path points. The PTZ parameters are established at each one of the plurality of points, and linear interpolation is applied between the PTZ parameters established at the points. The PTZ parameters cover points and not regions except as implicitly defined by proximity to the points.

Figure 2:
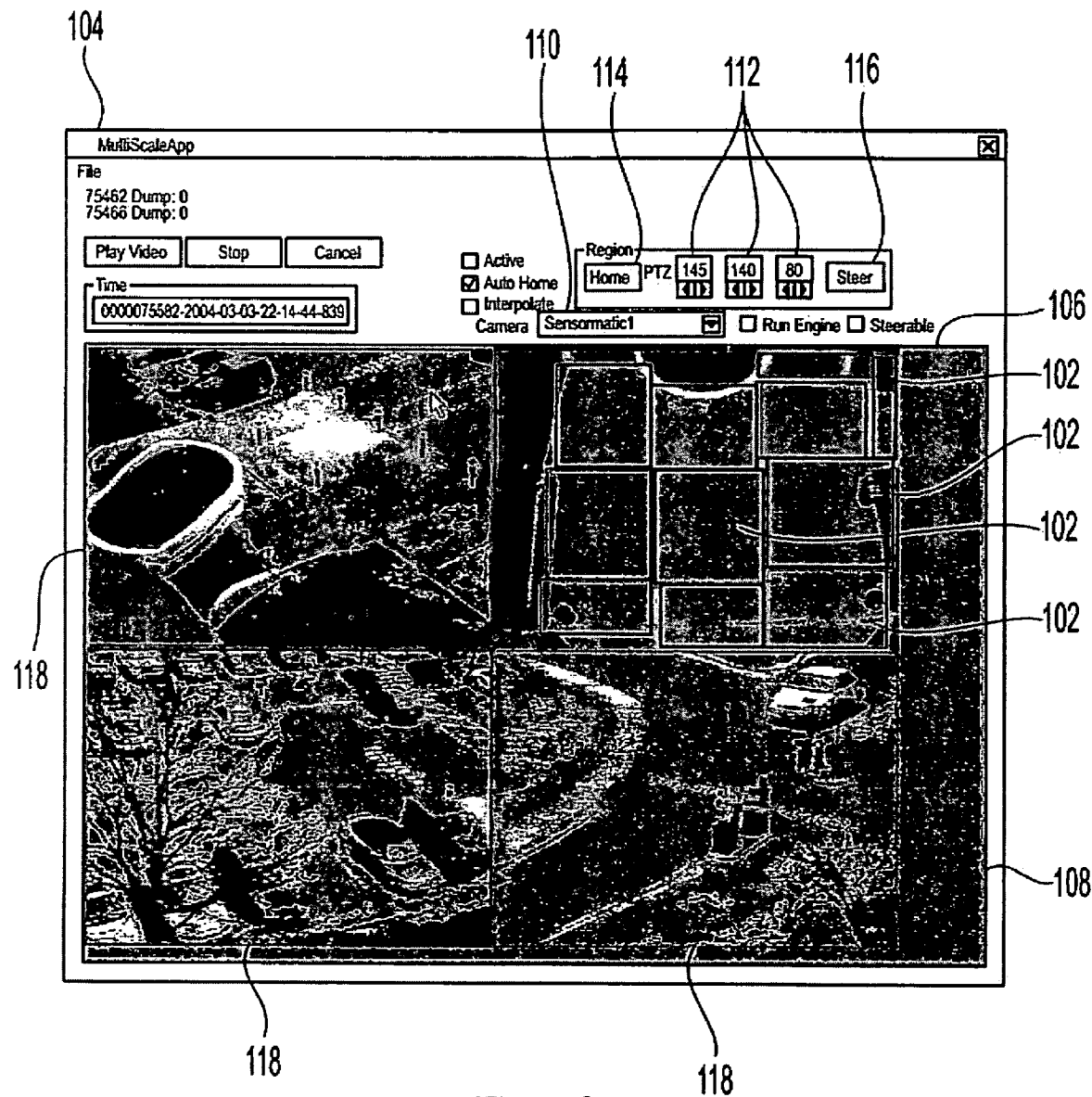
FIG. 2 is an illustration of a graphical user interface for assigning regions of interest to steerable cameras.

Referring to FIG. 2, in one embodiment, a GUI 104 is provided for manipulating the regions of interest 102 within a given field of view 106 associated with a master camera. The contents of the field of view 106 are displayed in a display area 108 within the GUI 104. The displayed contents can be a live video feed or a replay of captured and saved video or still image data. The GUI 104 provides for the selection and indication of the file or camera being displayed through the use of a pull-down menu box 110. Video processing algorithms, i.e. motion detection and tracking, are applied to this video feed. In one embodiment, events are triggered by motion detection in the fixed camera.

The GUI 104 facilitates indication or creation of the regions of interest 102 within the displayed field of view. In one embodiment, creation of the regions of interest 102 is accomplished by drawing the regions of interest directly on the displayed contents of the field of view 106. As each region is drawn, the pan, tilt and zoom associated with this region are chosen by manually steering the camera with the PTZ windows 112 and the steer button 116. Each region can be named in a PTZ region window 114, and a given steerable camera can be directed to a given region by selecting a steer button 116. Selection among the various fields of view 102 is accomplished by entering the name of the field of view in the PTZ region window, using a pointing device and clicking in one of the regions or using the tab key to move from region to region. The currently selected region is indicated by a color change of the box or any other suitable visual indication.

The GUI interface also provides for the association of each region with one or more of the steerable cameras and for the display of the current video information being capture by one or more of those steerable cameras. In one embodiment, one or more outputs 118 from the steerable cameras are also displayed in the display area 108. The steerable camera outputs 118 can be resized either manually or automatically to fit within the display area 108. In one embodiment, a steerable camera output window 118 is selected using suitable methods available in GUI's, and an identification of that camera appears in the pull-down menu box 110. A region of interest 102 is also selected, and the steerable camera is steered toward the selected region of interest, for example by using the steer button 116. Alternatively, a region of interest can be selected and dragged into a camera output window 118, or PTZ values for the steerable camera can be manually entered or modified in the PTZ windows 112. During operation of the surveillance system, events of interest occurring in on or more of the regions of interest 102 cause the steerable cameras associated with these regions of interest to be activated and steered to the positions defined by the PTZ parameters.

Figure 3:
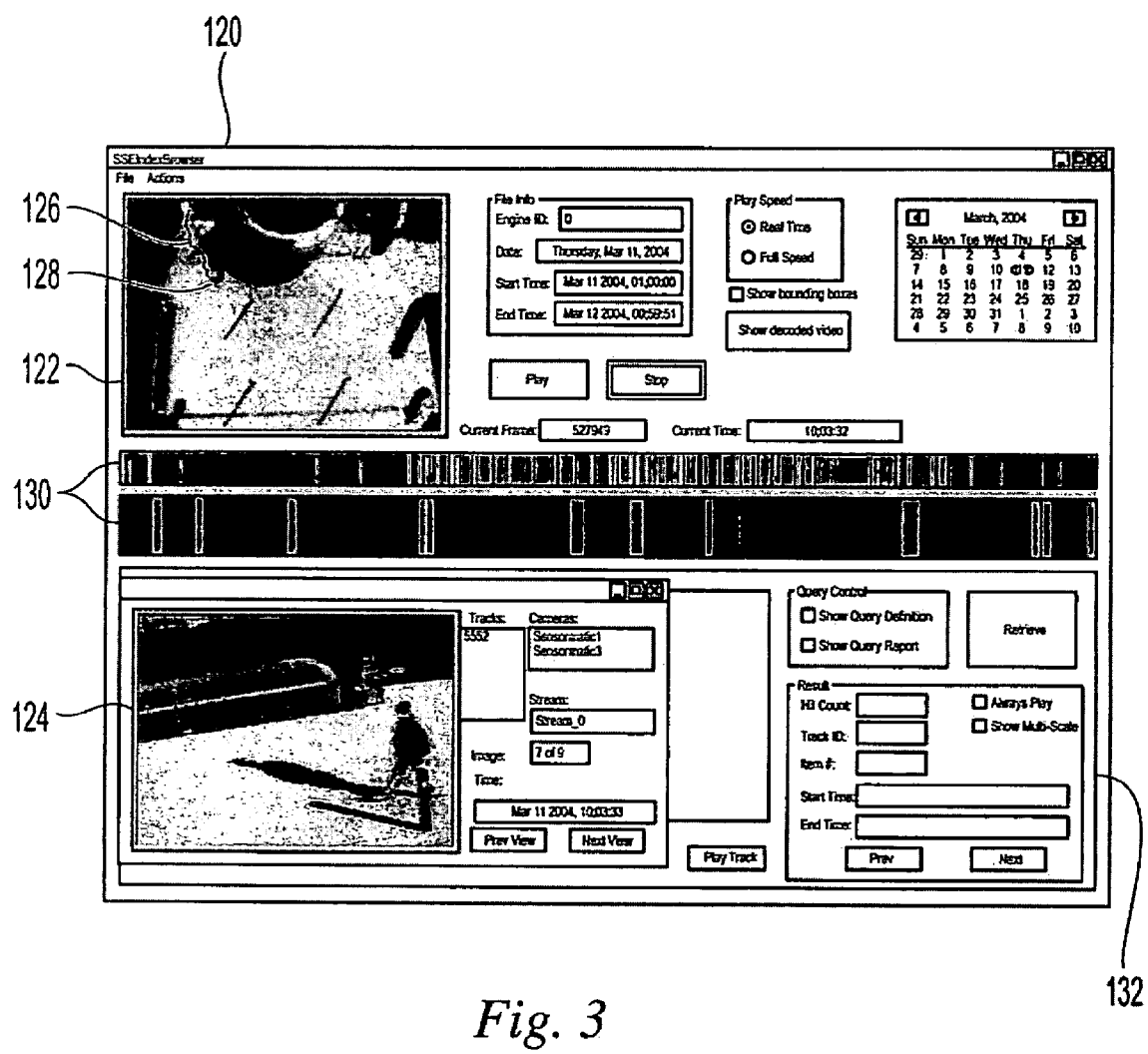
FIG. 3 is an illustration of a graphical user interface for displaying tracking video data.

As illustrated in FIG. 3, exemplary surveillance systems in accordance with the present invention include a multi-scale browsing GUI 120. The multi-scale browsing GUI facilitates simultaneous browsing of the video output from one of the master cameras in combination with the high-resolution images from one of the steerable cameras. The video outputs can be live video feeds or stored video tracks, for example database entries associated with one or more multi-scale images and stored in the database. These database entries include objects of interest, events of interest and object tracks. The control mechanism can read from the database and select one or more of the database entries, and the GUI is used to display the multi-scale images associated with the selected database entries. In one embodiment, the stored video tracks can be selected and replayed along with the corresponding automatically-acquired zoomed-in multi-scale imagery, providing security operators with an enhanced ability to analyze events and to recognize objects of interest within those events, for example individuals, vehicles and other objects. In order to provide for the selection and viewing of video information, the multi-scale browsing GUI 120 includes a first window 122 for displaying the video feed from the master camera and at least one second window 124 for displaying the video feeds from one or more steered and zoomed cameras. Selection and control of the video feeds is provided through various boxes, buttons and menus disposed within the GUI. These boxes include, but are not limited to, track information 126 for an object of interest 128 superimposed in the first window 122, two activity bars 130 showing track activity in two different time scales, and a query interface 132.

In general, surveillance systems in accordance with exemplary embodiments of the present invention include arrangements of fixed and steerable cameras, and these arrangements can be rather complex. Any single camera from among this plurality of cameras can be used to track multiple objects of interest at the same time. Therefore, in one embodiment, the present invention includes a camera control policy that determines which cameras should be steered and focused at which objects of interest. Suitable camera control polices are typically application dependent. Examples of criteria that are optimized by the camera control include, but are not limited to, the following criteria.

Observing each object of interest at least once
Observing each object of interest from as many views as possible
Maintaining continuous tracking of objects of interest
Steering the camera to give a frontal face image
Steering the cameras to maximize a combined quality measure of the imagery of the targets, e.g. maximal coverage, highest resolution, most frontal face views, least motion blur, taking into account each object's current and predicted appearance, behavior, location and the previously acquired images.

In one embodiment, the camera control policy assigns all steerable or slave cameras to the first object of interest that is identified by the master camera. As additional objects of interest are identified, the assignments of the steerable cameras are moved from the first object to the subsequent objects of interest. In addition, the control mechanism permutes the steerable cameras on regular, pre-defined intervals, for example every two seconds, to obtain varying views of each object of interest. Examples of various time-based active camera control policies and the effectiveness of these policies are described in C. J. Costello, C. P. Diehl, A. Banerjee, and H. Fisher, *Scheduling an Active Camera to Observe People, in Visual Surveillance and Sensor Networks*, page 46, ACM, October (2004), which is incorporated herein in its entirety by reference.

In another embodiment, a single camera is used as both the master and the slave camera. As in the multiple camera system with separate master and slave cameras, regions of interest are designated within the field of view of the single camera, and the pan, tilt, zoom beads corresponding to each region are established. In operation, the single camera initially functions as the master camera and utilizes a tracking system to track objects of interest through its field of view and to predict the future path of these tracks. When a given path is predicted to enter a region of interest, tracking is suspended, and the single camera is operated as a slave camera. In this slave camera mode, the control mechanism uses the appropriate pan, tilt and zoom information to steer the single camera to the appropriate region of interest. The single camera remains in the slave camera mode for a predetermined period of time and then reverts to the master camera mode, returning all of the camera parameters to the appropriate settings. The single camera operates as a master camera, using tracking and background modeling, until the next target is triggered.

An example application of the single camera system is a license plate recording system. A single PTZ camera surveys an entrance, tracking passing vehicles and pedestrians and recording the tracking information, for example in a Smart Surveillance Index. When a vehicle approaches an entrance barrier, that vehicle enters a region of interest, triggering the single camera to switch to slave camera mode. The single camera then zooms in on the region of interest and records one or more images containing the license plate of the vehicle. After recording an image of the license plate, the camera returns to the master camera mode and resumes the wide-angle tracking surveillance.

In another embodiment, the surveillance system includes two cameras, and each camera can act as both a master camera and a slave camera. This type of system works well in applications where the number of objects to be tracked is low and the likelihood of multiple simultaneous trackings is remote. Initially, both cameras operate in master mode, tracking objects that pass through the field of view. When an object of interest is observed and tracked in one camera, that camera continues to track the object. The other camera is switched to slave mode to acquire multi-scale imagery of the object of interest. Therefore, multi-scale imagery can be obtained while only sacrificing short periods of master camera mode time from one of the cameras. Additional cameras are not required.

Automatic calibration for PTZ control and steering of a slave camera to an object of interest tracked by a master camera can be achieved by inferring the three-dimensional (3D) position of that object, e.g. by triangulation from two cameras. The relation of the slave camera's position within the coordinate frame of reference is known as is the pan, tilt and zoom behavior of that camera. In accordance with exemplary embodiments of the present invention, a single master camera is used and calibration is not performed. Therefore, a 3D position approach is not used.

Figure 4:
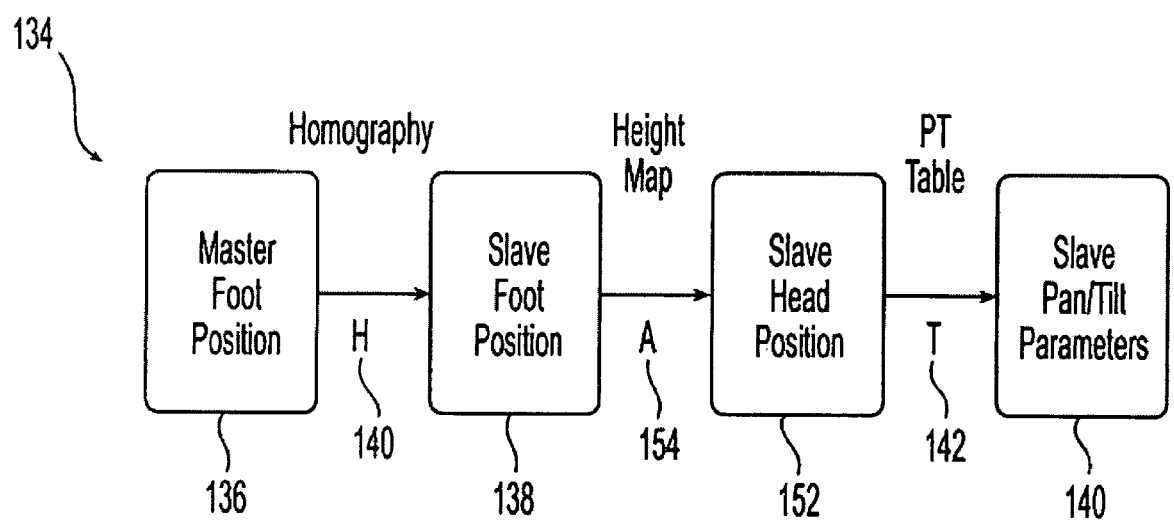
FIG. 4 is a flow chart illustrating an embodiment of a method for automatically calibrating steering parameters.

Referring to FIG. 4, in one embodiment, steerable slave cameras are steered to a pan, tilt and zoom coordinate calculated using a series of transformations 134. Each transformation is learned automatically from unlabelled training data. The sequence of transformations allows a slave camera to focus on an event or object of interest tracked in the master camera's field of view. The transformations are based on the assumption that at least one part of each object of interest moves along a plane. For example, the lowest point of a given object is typically the point of contact with the ground, e.g. a human foot is in contact with the ground, and the ground is substantially planar. This assumption is used to build the desired transformations.

In one embodiment, the calibration of a first camera relative to a second camera is performed by initially pointing the slave camera, either manually or automatically, at the same general area that is viewed by the master. Therefore, the slave camera has an overview of the area in which it will track objects. The ground or floor in the area being viewed is approximately planar, and a linear transform, or homography, is used to map ground plane points in the field of view of the master camera into points in the field view of the second camera. As illustrated, the position of the foot of the object of interest in the master camera field of view 136 is mapped to the position of the foot of the object in the slave camera field of view 138.

Surveillance systems in accordance with the present invention learn this homography automatically using a method based on the method described in Chris Stauffer and Kinh Tieu, *Automated Multi-Camera Planar Tracking Correspondence Modeling, Proceedings of Computer Vision and Pattern Recognition*, Volume I, pp. 259-266, July 2003, which is incorporated herein by reference in its entirety. The homography, H 140, is defined as the homography that best matches a set of points (x, y) on the ground plane in one image to the positions (x', y') of those same points when seen from the other camera.

$$x' = \frac{\hat{x}}{\hat{z}} \quad (1)$$

$$y' = \frac{\hat{y}}{\hat{z}} \quad (2)$$

$$\begin{pmatrix} \hat{x} \\ \hat{y} \\ \hat{z} \end{pmatrix} = H \begin{pmatrix} x \\ y \\ 1 \end{pmatrix} \quad (3)$$

In one embodiment, suitable pairs of corresponding points are obtained by using a tracking system in accordance with the present invention. A Smart Surveillance Engine (SSE) is applied simultaneously to the fields of view of both the master camera and the slave camera, and tracks associated with the object of interest are obtained from both views. The length of time the SSE is run is sufficient to provide the desired level of correspondence. In one embodiment, the length of time is about one hour or the length of time sufficient to generate about 100 tracks. The obtained tracks are stored in the database. Tracks stored in the database are processed so that only tracks of sufficient duration are retained, and parts of tracks that take place when no track is visible in one of the fields of view are discarded as these tracks lack corresponding points.

In one embodiment, the homography is determined using a Random Sample Consensus (RANSAC) procedure. Initially, sets of data points from three tracks are randomly selected from one of the views, either master or slave. For each of the three selected tracks a simultaneous track obtained from the field of view of the other camera is selected. Data points within the tracks having the same timestamp are assumed to correspond. Using these corresponding points, a least-squares fit homography is generated. The homography is then applied to all the data points in the database having correspondences. The corresponding point generated by the homography is compared to the actual corresponding point, and the number of points having a calculated corresponding point sufficiently close to the actual value of the corresponding point is determined. The process of homography generation is repeated iteratively, for example up to 500 iterations or more, to generate a plurality of separate homographies. Each homography will have an associated count indicating the number of points calculated using the homography that are adequately equivalent to the actual corresponding points. Therefore, this count gives an indication of the sufficiency of fit of a given homography. The homography with the highest number of matches or count is selected as the best fit. Since a correspondence among the points is more difficult to determine when there are multiple tracks at the same time, the sampling distribution is biased towards tracks that have only one possible corresponding track. In addition, the sampling is preferably biased towards longer tracks.

Steering of the moveable cameras requires knowledge of the effect of the pan, tilt and zoom controls of a given camera. Although the effect of the pan, tilt and zoom controls can be determined from the manufacturer's specifications for a given camera, these specifications are often unknown. In addition, the cameras can be un-calibrated, or the specifications of a given camera can change over time. In one embodiment of the present invention, the pan and tilt commands of a given steerable camera are learned 140 (FIG. 4). The effect of zoom controls can also be learned but is optional for purposes of the present invention.

Initially, one or more of the steerable cameras are steered to the known home position where the camera correspondence homography was trained. A point tracker is initialized by finding corners. Then, the steerable camera is issued a series of pan and tilt commands (p,t) to move the camera around the home position in a pre-determined pattern. Suitable patterns include spiral patterns and twelve-armed star configurations that are repeated until the motion has moved the optic center beyond a boundary of the original view. While the camera is being moved in the pre-determined pattern, patches around points in the field of view of the steerable camera are tracked. Suitable methods for tracking points include using a Lucas Kanade tracker as described in Jean-Yves Bouguet, *Pyramidal Implementation of the Lucas Kanade Feature Tracker*, Intel OpenCV Documentation (1999). The entire disclosure of this reference is incorporated herein by reference. RANSAC is again used to find the affine transform that best fits the points' motions, making the fit robust to mismatches and to points that are obscured by objects in the scene during this calibration procedure. For each pan/tilt pair the motion $(x'-x_0', y'-y_0')$ of the optic centre $(x_0', y_0')$ is recorded. After completing a pattern, a least-squares linear transform T 142 is fit to all points.

$$\begin{pmatrix} p \\ t \end{pmatrix} = T \begin{pmatrix} x' - x_0' \\ y' - y_0' \\ 1 \end{pmatrix} \quad (4)$$

Figure 5:
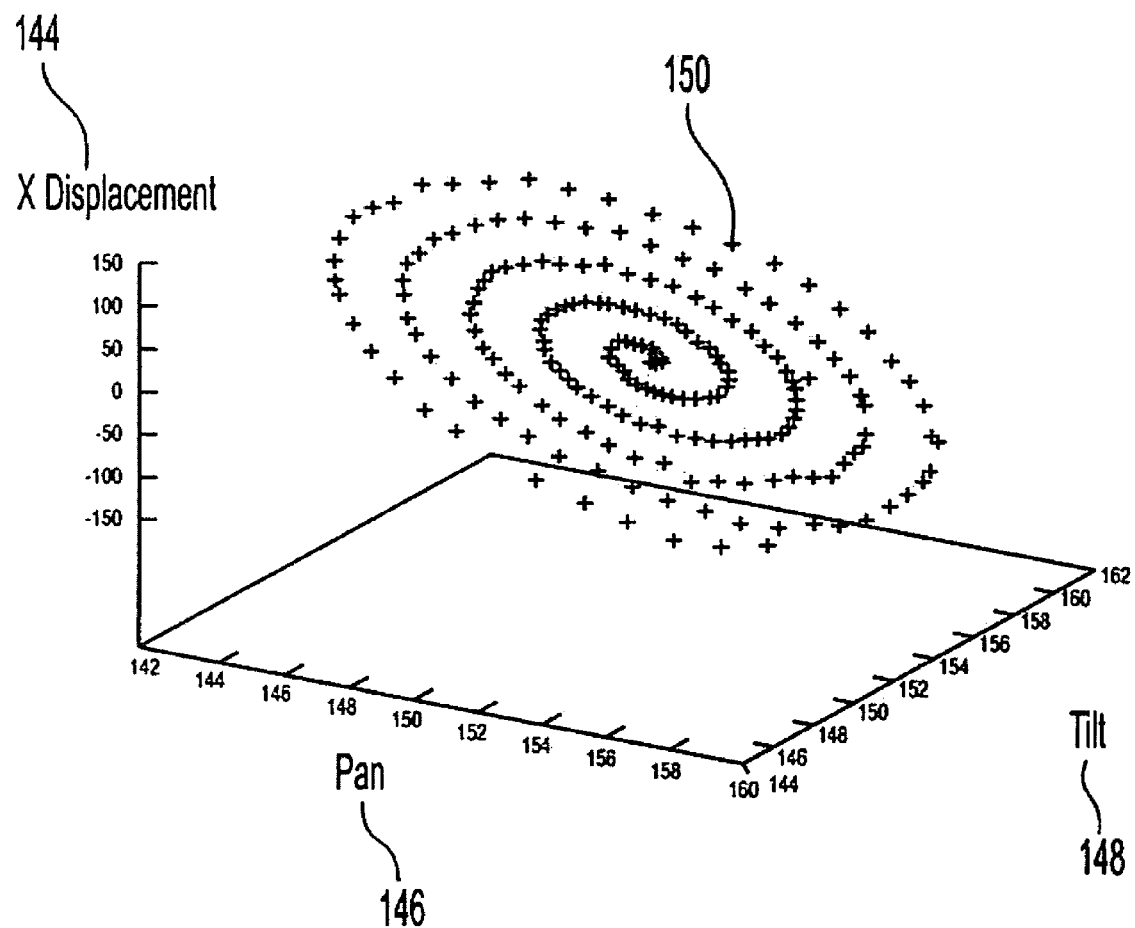
FIG. 5 is a plot of the pan, tilt and x displacement for a given steerable camera during calibration of the steering parameters.

Referring to FIG. 5, a plot of the x displacement 144 versus pan 146 and tilt 148 positions is illustrated. The points 150 in the graph are for the spiral camera motion portion of the training pattern.

As described, the pan and tilt calibration maps image points on the ground or foot plane of the master camera into the steering parameters to be used for the steerable camera to foveate on the same point. Objects of interest, however, are often not limited to a two-dimensional plane and in particular to a two-dimensional plane located substantially on the ground. If all of the objects of interest were located substantially an equivalent distance from the ground, the homography could be applied to this common plane. This is typically not the case, and the present invention includes methods and systems to focus or zoom-in on the top or head, for example the head of a pedestrian, of the objects of interest regardless of height of the head above the ground. The present invention includes a method for approximating the head position with the highest pixel in a tracked object. In one embodiment, the location of the head in the slave camera view of the object of interest is determined using a system to find the mapping between object height h in the master camera image and height $h_0$ in the slave camera image 152.

For a given object foot location, the height of that object in the slave camera view is proportional to the height of that object in the master camera view. In addition, the head and foot pixels will each closely correspond in two different views, under certain conditions, e.g. if the objects are tall and thin. The factor of proportionality depends on the location of the object of interest within the field of view. Therefore, the transform $A=(a_0, a_1, a_2)$ 154 is as follows:

$$h' = hA \begin{pmatrix} x \\ y \\ 1 \end{pmatrix}, \quad (5)$$

where (x, y) is the position of the object of interest in the master camera image.

In one embodiment, the transformation A is estimated by a least-squares fit on the set of object tracks used to determine the homography, using only the points for which the homography determines the correct correspondence. In one embodiment, all of the cameras are assumed to be aligned and to have a relatively small distortion so that object heads lie substantially vertically above the feet. Alternatively, if the object heads do not lie substantially vertically about the object feet, a more complex mapping is used.

Methods for tracking objects of interest using video surveillance systems in accordance with the present invention steer PTZ cameras to automatically follow objects of interest that are tracked with a master camera. Extrinsic or intrinsic calibration of the fixed and steerable cameras in the video surveillance system is not required. In one embodiment, the cameras are calibrated by manually setting up of a set of "beads". In another embodiment, a fully automatic method is used to calibrate surveillance systems containing a plurality of cameras. Surveillance systems in accordance with the present invention support arbitrary combinations of master and slave cameras, even allowing a single camera to act as both the master and slave cameras.

Figure 6:
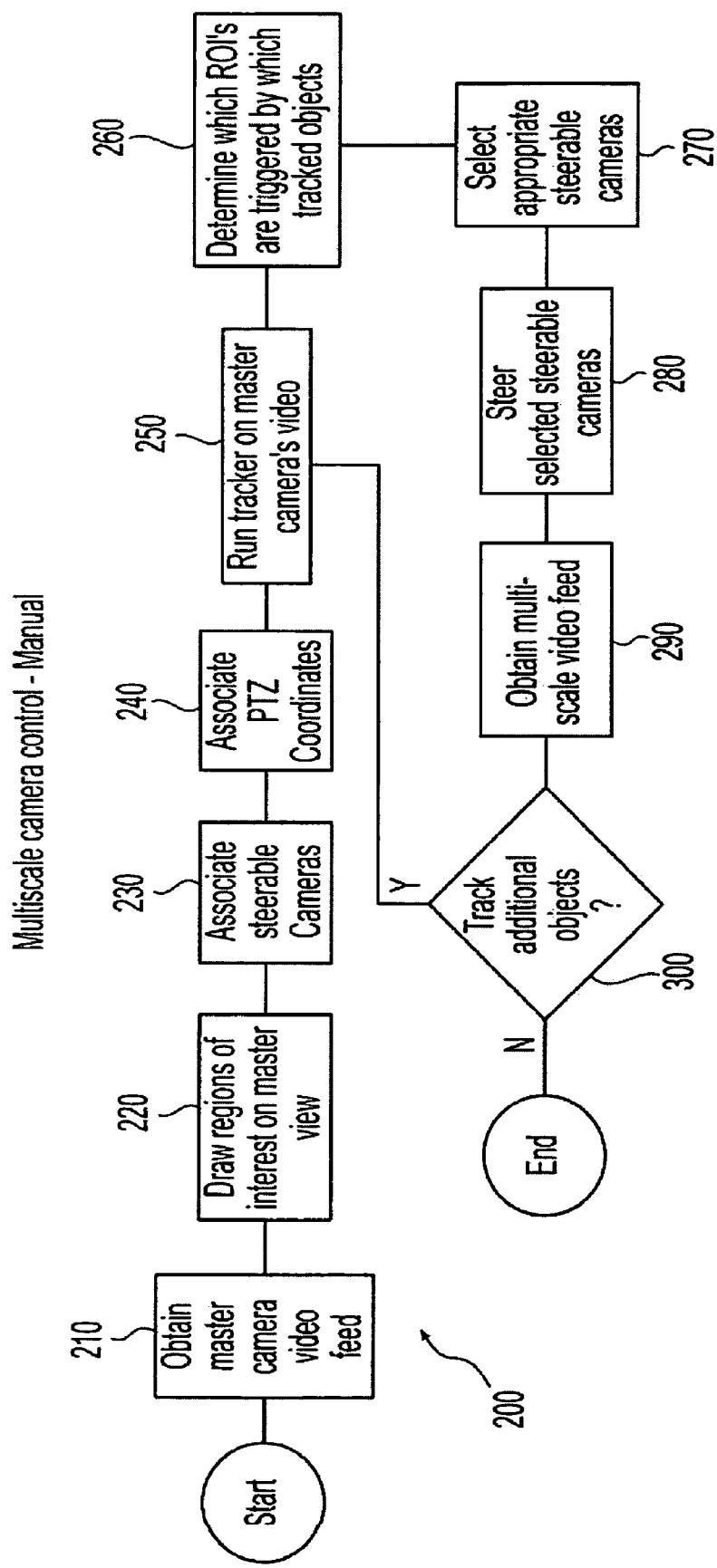
FIG. 6 is a flow chart illustrating an embodiment of a method for obtaining multi-scale images using manual calibration in accordance with the present invention.

Referring to FIG. 6, an embodiment of a method for multi-scale camera control with manual calibration 200 in accordance with the present invention is illustrated. Initially, the video feed from at least one master camera is obtained 210. This video feed can be a live feed or can be a play-back of a previously recorded video feed. Having obtained the master camera video, regions of interest are defined within the field of view of the master camera video feed 220. Suitable methods for defining the regions of interest include drawing or outlining the regions of interest in a GUI of entering coordinates to define the region of interest. Since multi-scale images of the regions of interest are to be obtained, each region of interest is associated with at least one steerable slave camera 230. In one embodiment, the master camera and the slave camera are the same camera. Suitable methods for associating steerable cameras with regions of interest include using a GUI. Regardless of the method used to make the association, the pan, tilt and zoom parameters required for each associated steerable camera to view the region of interest are provided to the steerable camera 240. In one embodiment, the pan, tilt and zoom parameters are automatically generated after the slave camera is manually steered to the region of interest. In another embodiment the pan, tilt and zoom coordinates are entered and downloaded to the slave camera.

The master camera monitors the area within its field of view for objects of interest. Once an object of interest is identified, the object of interest is tracked through the field of view 250. Any suitable algorithm for tracking moving objects through the filed of view of a camera can be used. In addition to tracking the current movements of the object of interest, a likely future track of the object of interest is determined, and the regions of interest are identified that intersect with either the present or future track of the object of interest 260. One or more of the slave cameras associated with the identified regions of interest are selected 270 to monitor those regions of interest through which the object of interest is likely to pass. The selected slave cameras are then steered to the appropriate regions of interest 280 using the pan, tilt and zoom parameters previously provided for those regions of interest. Once steered to the appropriate regions of interest, each steerable camera obtains the desired multi-scale video feed of the region of interest 290. This video feed can be displayed and stored in a database. In addition, objects of interest can be tracked by each slave camera as these objects pass through the regions of interest. A check is then made about whether or not to track additional objects passing through the field of view of the master camera 300. If additional objects are to be tracked, then the process of tracking and slave camera selection is repeated. If not, the video monitoring process is halted.

Figure 7:
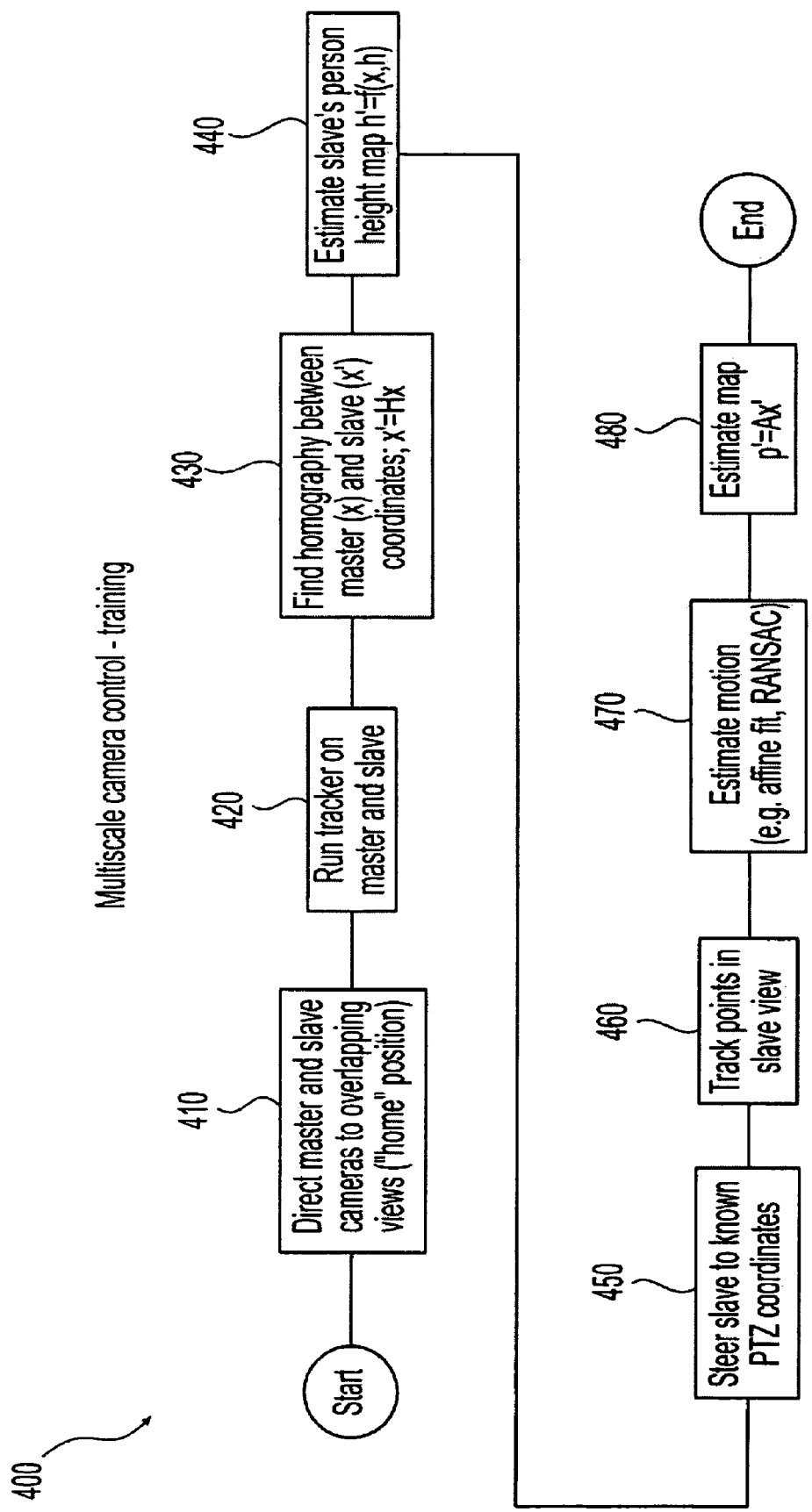
FIG. 7 is a flow chart illustrating an embodiment of a method for automatic calibration of the steering parameters in accordance with the present invention.

Referring to FIG. 7, an embodiment of a method for controlling slave cameras for multi-scale image acquisition 400 is illustrated. Initially, at least one master camera and one slave camera are steered to the same general view 410 such that the fields of view of the two cameras overlap. Preferable, both the master and slave cameras are pointed to the same ground or foot position of an object of interest. The master and slave cameras then track that object of interest as it passes through the respective fields of view 420. Using methods as described above, a homography is determined between the tracking of the object in the master camera and the slave camera 430. Since the height of the object of interest in the slave camera is proportional to the height of the object of in the master camera, this proportionality is determined to estimate the height of the object of interest in the slave camera 440.

Having calibrated the home location of the slave camera to the home location of the master camera and determine the homography and height proportionality between the master and slave cameras for objects of interest, the calibration of the pan and tilt controls of the slave camera are determined. First, the slave camera is moved in accordance with a known, predetermined pattern 450. Points within the field of view of the slave camera are tracked 460 while the slave camera is moved in the known pattern. Based upon the tracking of the points, the motion of the slave camera is estimated 470, for example using affine fit or RANSAC. The estimated motion and known points are used to create an estimated map 480 form which the calibration parameters can be determined. Given an initial location, homography, height map and calibration, any slave camera can be assigned to track and object of interest that was initially tracked in the master camera.

Figure 8:
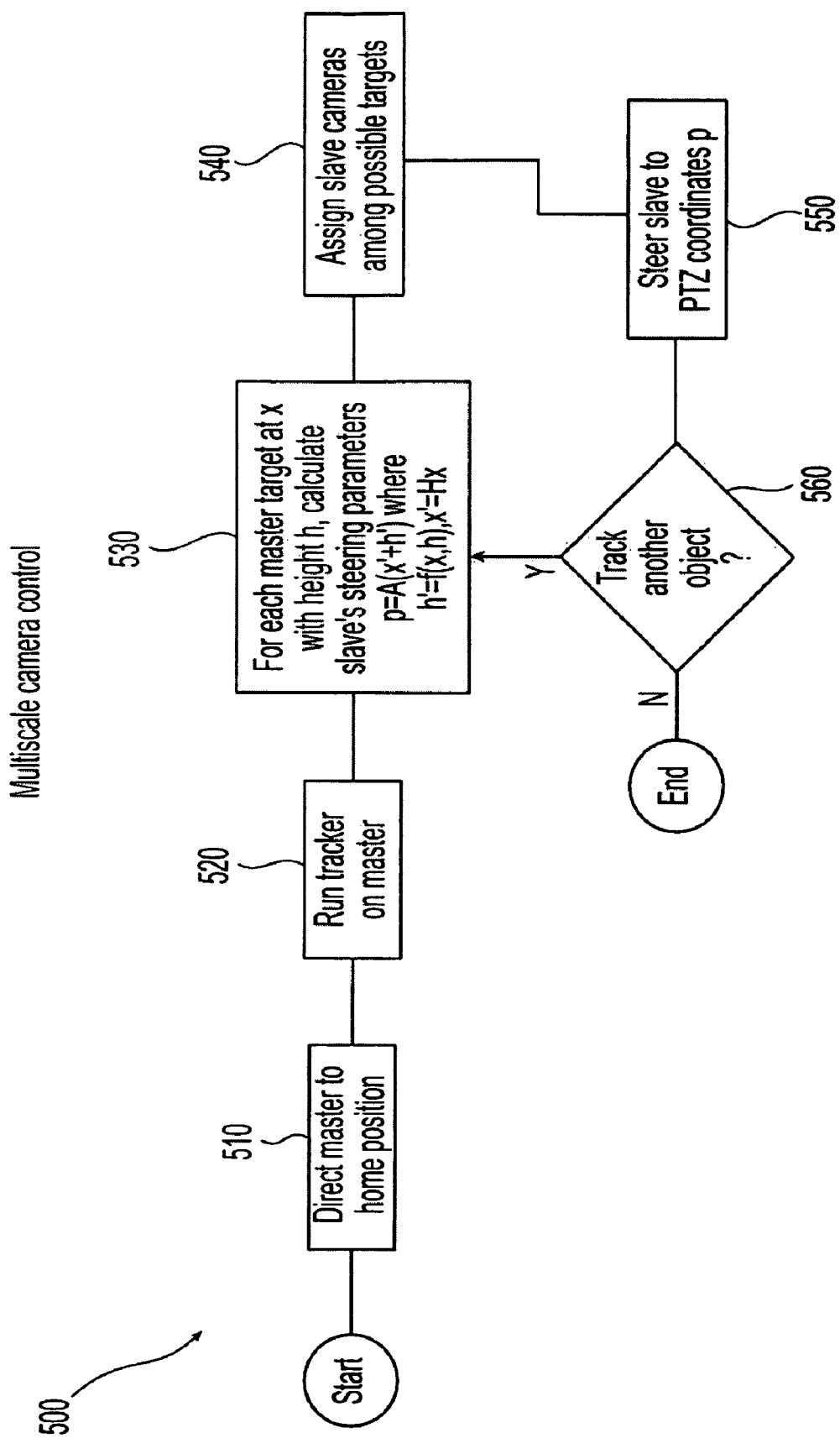
FIG. 8 is a flow chart illustrating an embodiment of a method for obtaining multi-scale images using automatic calibration in accordance with the present invention.

Referring the FIG. 8, an embodiment of tracking an object of interest based upon these calculated slave camera steering parameters 500 is illustrated. The master camera is directed to its home position 510 to monitor its field of view for events and objects of interest. The master tracks an object of interests that passes through its field of view 520. For a given tracked object, the steering parameters necessary for the slave cameras to monitor a given object of interest are determined 530. Then, one or more slave cameras are selected 540 for each identified object of interest, and the calculated steering parameters are used to steer the selected slave cameras to the appropriate PTZ coordinates 550. A determination is then made to track another object of interest in the master camera 560. If another object is to be tracked, then tracking is run again on the master camera 520. If not other objects are to be tracked, the system is halted.

The present invention is also directed to a computer readable medium containing a computer executable code that when read by a computer causes the computer to perform a method for acquiring multi-scale images by pan-tilt-zoom control using manual or automatic multi-camera calibration in accordance with the present invention and to the computer executable code itself. The computer executable code can be stored on any suitable storage medium or database, including databases in communication with and accessible by the control mechanism performing the method in accordance with the present invention. In addition, the computer executable code can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for acquiring multi-scale images, the method comprising: tracking an object of interest moving through a field of view of a master camera; dividing the field of view of the master camera into a plurality of independent, non-overlapping, predefined regions of interest;
   calibrating a steerable slave camera to obtain multi-scale images of the object of interest by associating the steerable camera with one of the plurality of predefined regions of interest within the field of view of the master camera and setting pan tilt and zoom parameters for the slave camera so that a field of view associated with the slave camera is equal in size to its associated regions of interest;
   determining a predicted future path for the object of interest, the predicted further path passing through the predefined region of interest associated with the steerable camera;
   using the slave camera in accordance with the calibration to track the object of interest through the associated predefined region of interest; and
   obtaining multi-scale video of the object of interest using the slave camera;
   wherein the step of calibrating a steerable slave camera comprises calibrating a plurality of steerable cameras such that each steerable camera is associated with a separated predefined region of interest within the field of view of the master camera along the predicted future path of the object of interest.

2. The method of claim 1, wherein the master camera and the slave camera comprise a single camera.

3. The method of claim 1, wherein the step of identifying an object further comprises identifying a plurality of objects, the step of calibrating a steerable slave camera comprises calibrating a plurality of steerable cameras, each steerable camera associated with a predefined region of interest within the field of view of the master camera and the pan, tilt and zoom parameters for each slave camera set so that a field of view associated with each slave camera is equal in size to its associated region of interest, and the method further comprising using a camera control policy to associate steerable cameras with objects of interest so as to optimize at least one objective function comprising the imaged size of an object, the orientation of an object, the location of an object, the length of time an object is viewed, the number of times an object is viewed, the chance of viewing an object before that object is no longer visible, the speed of the object, the type of the object or any other measured parameter of the object, the time taken to steer an available camera to view the object and combinations thereof.

4. The method of claim 1, wherein the step of calibrating the steerable slave camera comprises generating at least one of the pan, the tilt and the zoom parameters for the steerable camera.

5. The method of claim 1, wherein the step of calibrating the steerable slave camera further comprises associating the steerable slave camera with more that one of the plurality of predefined regions of interest and the step of using the slave camera to track the object of interest further comprises using the slave camera to track to object of interest through each one of the associated predefined region of interests.

6. The method of claim 1, wherein the step of calibrating the steerable slave camera comprises calibrating a plurality of steerable slave cameras by:
   displaying a field of view of the master camera in a graphical user interface;
   identifying objects of interest in the field of view;
   defining the predefined regions of interest in the field of view;
   associating a steerable slave camera with each predefined region of interest;
   generating pan, tilt and zoom parameters for each steerable camera for objects of interest within the associated predefined region of interest.

7. The method of claim 6, wherein the step of determining the predicted future path further comprises:
   identifying current and predicted predefined regions of interest through which each object of interest tracks; and
   the method further comprises
   selecting steerable slave cameras associated with the identified predefined regions of interest in accordance with the pan, tilt and zoom parameters generated for the objects of interest that track through the predefined regions of interest.

8. The method of claim 1, wherein the step of calibrating the steerable slave camera comprises automatically calibrating the steerable slave camera.

9. The method of claim 8, wherein the step of automatically calibrating the steerable slave camera comprises:
   establishing a homography between the master camera and the slave camera for objects of interest;
   obtaining a height mapping between the master camera and the slave camera for objects of interest; and
   obtaining control parameters for the steerable camera.

10. The method of claim 9, wherein the step of establishing a homography comprises:
    directing the master camera and the steerable camera to a common position;
    generating a tracking data on a common object for both the master camera and the slave camera;
    using the tracking data from the master camera and the slave camera to generate the homography.

11. The method of claim 10, further comprising generating a multiple sets of tracking data, generating at least one homography for each set of tracking data and selecting a best fit homography for use with the steerable slave camera.

12. The method of claim 9, wherein the step of obtaining a height mapping between the master camera and the slave camera comprises determining the height proportionality between the master camera and the slave camera for a common object of interest.

13. The method of claim 9, wherein the step of obtaining control parameters for the steerable camera comprises:
    moving the slave camera in accordance with at least one known pattern;
    tracking points along the pattern while the slave camera is moving;

estimating the motion of the slave camera using the tracked points;

comparing the estimated motion of the track points to actual point locations from the known pattern; and deriving the control parameters from the comparison of estimated points to actual points.

14. The method of claim 13, wherein the step of estimating the motion comprises using affine fit or random sample consensus.

15. A non-transitory computer readable medium containing a computer executable code that when read by a computer causes the computer to perform a method for acquiring multi-scale images, the method comprising:

tracking an object of interest moving through a field of view of a master camera; dividing the field of view of the master camera into a plurality of independent, non-overlapping, predefined regions of interest;

calibrating a steerable slave camera to obtain multi-scale images of the object of interest by associating the steerable camera with one of the plurality of predefined regions of interest within the field of view of the master camera and setting pan tilt and zoom parameters for the slave camera so that a field of view associated with the slave camera is equal in size to its associated regions of interest;

determining a predicted future path for the object of interest, the predicted further path passing through the predefined region of interest associated with the steerable camera;

using the slave camera in accordance with the calibration to track the object of interest through the associated predefined region of interest; and obtaining multi-scale video of the object of interest using the slave camera wherein the step of calibrating a steerable slave camera comprises calibrating a plurality of steerable cameras such that each steerable camera is associated with a separated predefined region of interest within the field of view of the master camera along the predicted future path of the object of interest.

16. The non-transitory computer readable medium of claim 15, wherein the step of calibrating the steerable slave camera further comprises associating the steerable slave camera with more that one of the plurality of predefined regions of interest and the step of using the slave camera to track the object of interest further comprises using the slave camera to track to object of interest through each one of the associated predefined region of interests.

17. The non-transitory computer readable medium of claim 15, wherein the step of calibrating the steerable slave camera comprises automatically calibrating the steerable slave camera.

* * * * *